United States Patent [19]

Dispenza et al.

[11] Patent Number: 5,002,247
[45] Date of Patent: Mar. 26, 1991

[54] SUPPORT BRACKET

[75] Inventors: John A. Dispenza, Montville; Tor Alden, Sommerset, both of N.J.

[73] Assignee: Component Hardware Group, Inc., Lakewood, N.J.

[21] Appl. No.: 513,984

[22] Filed: Apr. 24, 1990

[51] Int. Cl.⁵ .................................................. A47B 3/06
[52] U.S. Cl. ...................................... 248/188; 248/432; 248/440; 248/151; 108/144
[58] Field of Search ............... 248/188, 151, 432, 440, 248/316.2; 211/183, 182; 403/391, 396, 400, 256, 260; 108/144, 111, 106

[56] References Cited

U.S. PATENT DOCUMENTS

| | | | |
|---|---|---|---|
| 2,954,638 | 10/1960 | Motter | 248/188 X |
| 3,344,756 | 10/1967 | Kelson | 248/188 |
| 3,604,369 | 9/1971 | Maslow | 248/188 X |
| 3,958,517 | 5/1976 | Jay | 248/188 X |
| 4,132,178 | 1/1979 | Mueller et al. | 108/144 |
| 4,138,953 | 2/1979 | Tashman | 108/144 |
| 4,237,798 | 12/1980 | Welsch et al. | 248/188 X |
| 4,848,245 | 7/1989 | Piretti | 403/391 X |
| 4,852,501 | 8/1989 | Olson et al. | 108/144 X |

FOREIGN PATENT DOCUMENTS

| | | | |
|---|---|---|---|
| 2580741 | 10/1986 | France | 403/260 |
| 8600204 | 1/1986 | World Int. Prop. O. | 248/188 |

Primary Examiner—Karen J. Chotkowski
Attorney, Agent, or Firm—Kenyon & Kenyon

[57] ABSTRACT

The support bracket is formed of two bodies which simultaneously engage the top surface of a shelf and the depending sides of the sheet metal shelf. A pair of locking bolts are provided to guide the inner body relative to the outer bracket body during securement of the bracket to a notched corner of a shelf. The bracket may be secured to shelving of different thicknesses. The brackets may be slid over tubular vertical legs to form tables or shelving.

26 Claims, 5 Drawing Sheets

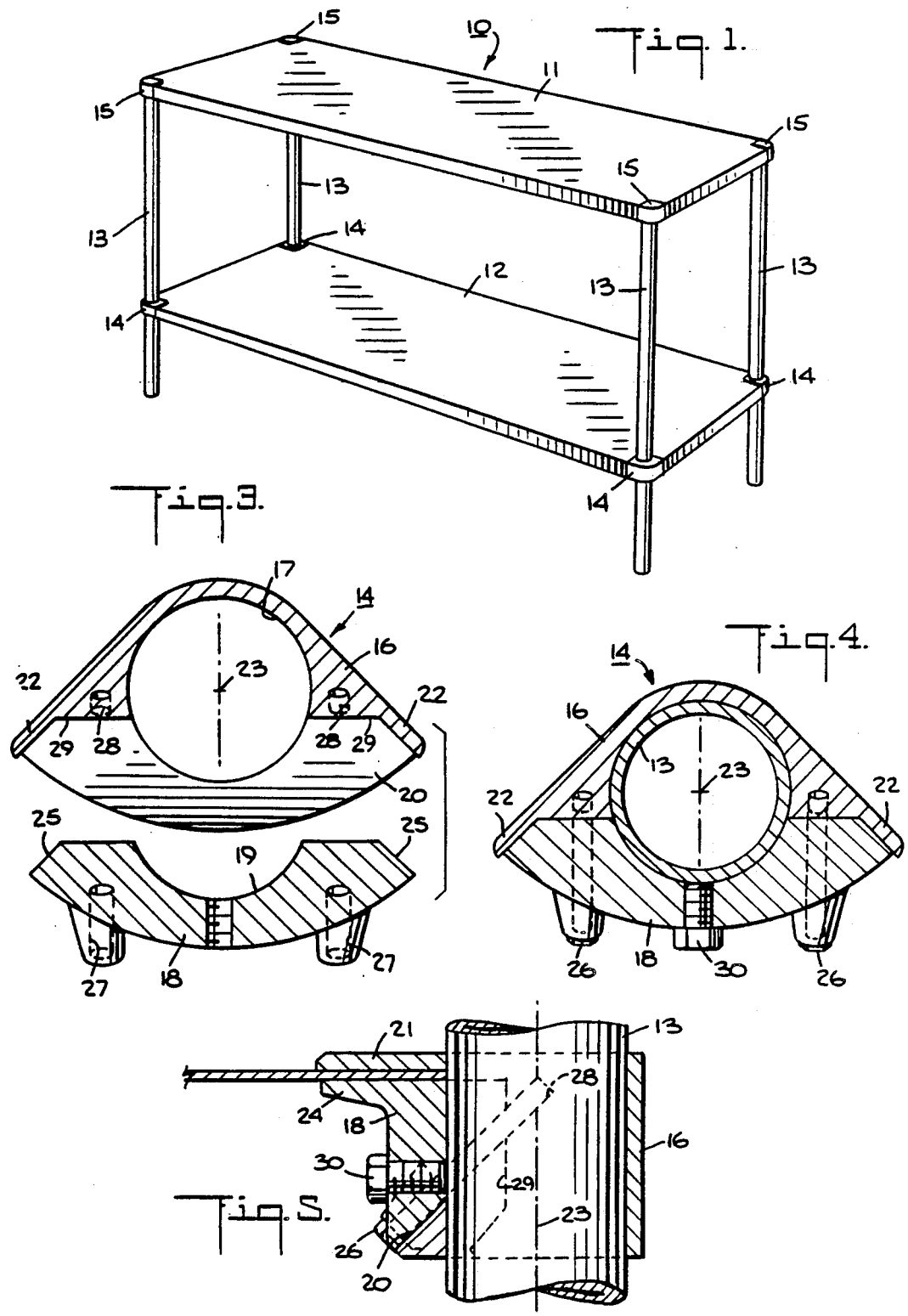

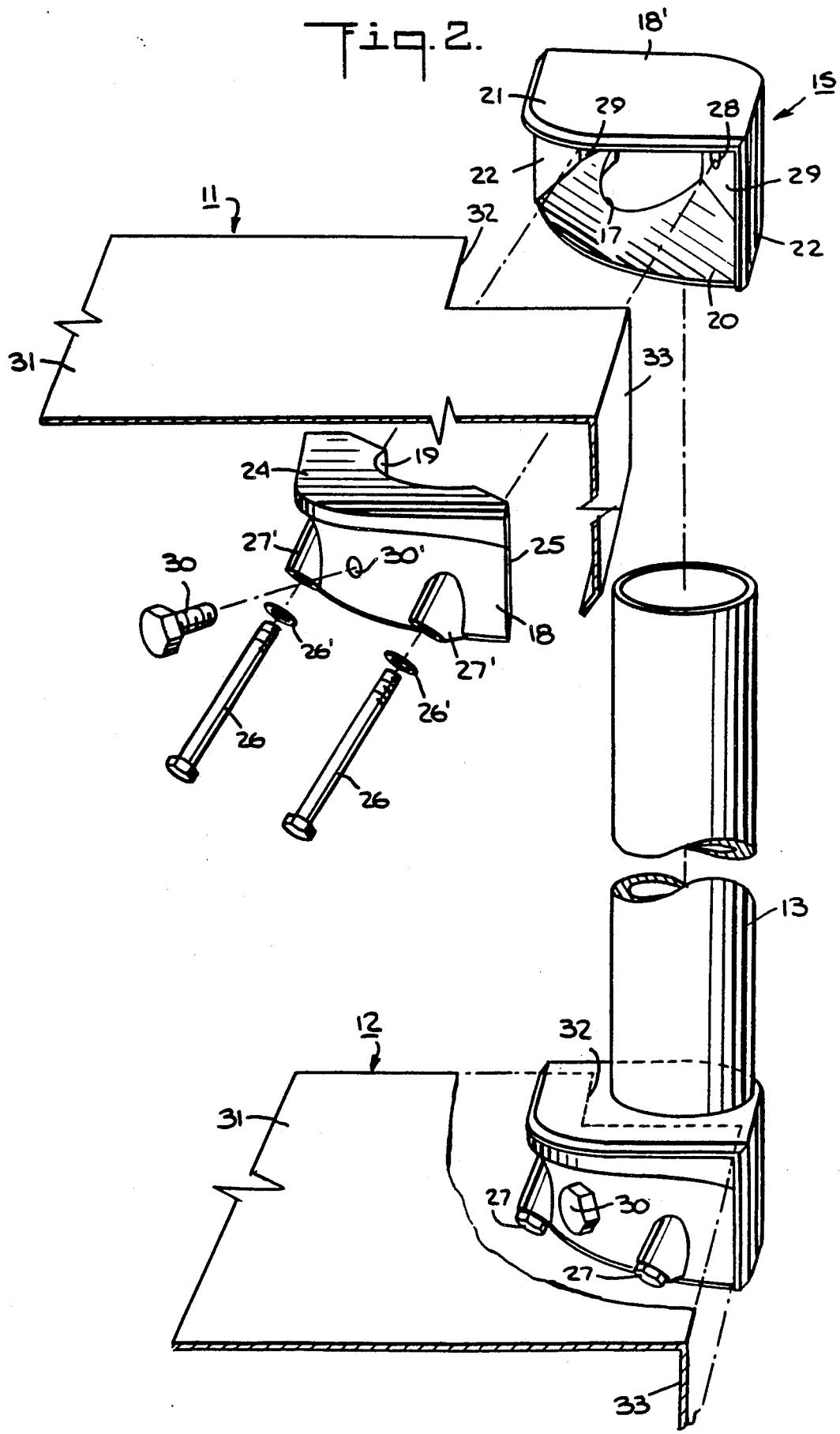

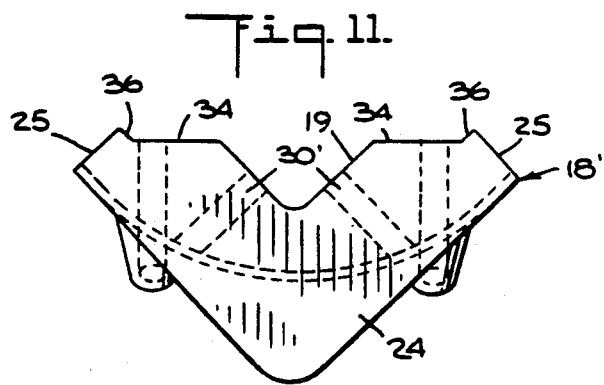
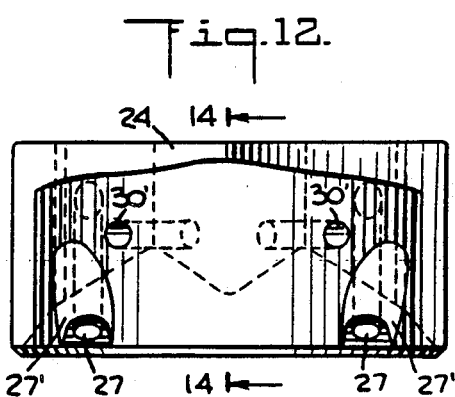
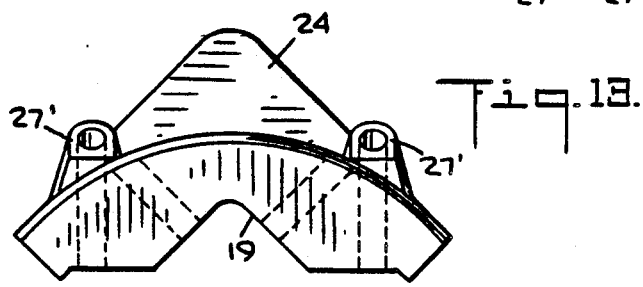
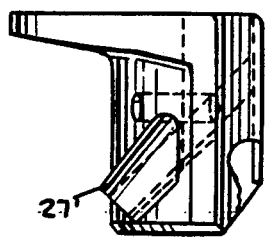
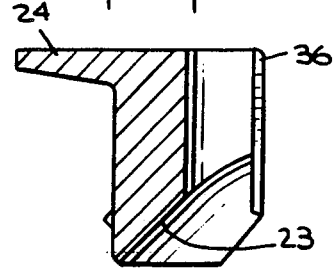

SUPPORT BRACKET

This invention relates to a support bracket. More particularly, this invention relates to a corner support bracket for tables, for example of sheet metal construction.

Heretofore, various types of brackets have been known for use in the construction of adjustable shelving and tables, particularly of the sheet metal type. For example, U.S. Pat. No. 2,150,795 describes a joint arrangement which employs a bracket which can be slid over and secured to a vertical leg as well as to the corner of a shelf in order to support the shelf on the leg. However, such a bracket is employed in an offset relation to the corner of the shelf thus providing an undesirable projection from the basic contour of a table.

Other types of brackets have also been known, for example, from U.S. Pat. No. 3,065,860 and 3,344,756 wherein the bracket can be mounted within the plane of a corner of a shelf while at the same time receiving a vertical leg of tubular construction. However in the of case the bracket described in U.S. Pat. No. 3,065,860, the sheet metal shelving requires inwardly directed flanges along the lower edges which must be rolled upwardly against the inner sides of the bracket in order to form a joint. The bracket described in U.S. Pat. No. 3,344,756 basically receives a shelf in an overlying manner such that the shelving may be vertically raised relative to the bracket. To prevent this, the shelving has been provided with a depending screw to be received within an aperture of the bracket and held in place by a lock nut. In either case, several manipulative operations are required to construct a table.

U.S. Pat. No. 4,237,798 describes a further type of bracket of multi-component structure which can be secured to a truncated corner of the shelf while at the same time enveloping an upright tubular leg. However, this requires the shelving to be made with formed corners which increase the cost of construction.

As is known, certain industries, such as the food industry require shelving to be free of corners, recesses and the like in which food may become trapped over time. In such cases, the shelving must be of a nature to permit cleaning of the corners or recesses in order to ensure a sterile environment. As is also known, shelving may be formed of different thicknesses, thus, the brackets which are used to secure such shelving to upright legs must be of a type which can adapt to the different thicknesses of the shelving in a simple economic manner.

Accordingly, it is an object of the invention to provide a corner support bracket assembly which can be readily adapted to different thicknesses of shelving.

It is another object of the invention to provide a corner support bracket assembly which can be connected to shelving in a manner which precludes the existence of recesses or the like in which food may collect.

It is another object of the invention to be able to construct shelving for the food industry which is of a knockdown construction and which can be readily cleaned.

It is another object of the invention to provide a bracket assembly which can be readily installed.

It is another object of the invention to be able to reduce the costs of constructing shelving of sheet metal.

Briefly, the invention provides a corner support bracket assembly which is comprised of two bodies, means for adjusting the two bodies relative to each other and means in one of the bodies for engaging a tubular leg in locking relation.

In accordance with the invention, one bracket body is provided with a bore for receiving a tubular leg, a curvilinear cam surface which extends radially outwardly from the bore and a flange extending radially of the bore in spaced relation to the cam surface. The second bracket body is provided with a recess for receiving a tubular leg disposed in the bore of the first body, a second curvilinear cam surface slidably mounted on the cam surface of the first body in mating relation and a second flange extending radially of the recess and in parallel relation to the flange of the first body for clamping a flat object, such as a sheet metal shelf therebetween.

The means for adjusting the two bodies relative to each other may be in the form of a pair of bolts which extend through the second body in parallel relation while being threaded into the first body. The bolts are disposed so as to be in a plane at an angle to the central axis of the bore which is disposed in the outer body. For example, the angle is set at 45°.

The means in the inner body for engaging a tubular leg may be in the form of a locking screw which is threadably mounted in the body to in order to be threaded into abutment with a leg within the outer body.

The support bracket is particularly adapted for securing a shelf of sheet metal to a tubular leg. In particular, to a sheet metal shelf having a flat horizontal top, a notch in a corner of the top and depending side walls extending to the notch. In this embodiment, the outer body of the bracket has a pair of side walls which are sized to overlap the side walls of the shelf while the inner body has a pair of side walls in facing relation to the side walls of the outer body in order to clamp the side walls of the shelf therebetween. In this embodiment, the guide bolts serve not only to guide the inner body relative to the outer body but also provide for adjustment of the bracket to different thicknesses of shelving. In this respect, the spacing between the clamping surfaces of the two bodies are maintained at a constant spacing for the horizontal and vertical portions of a shelf, i.e. the horizontal top and the depending side walls of the shelf.

In one embodiment, the outermost bracket is provided with a bore which extends completely through the body so as to receive a tubular leg. In this case, the bracket would be secured to an intermediate shelf of a table. In another embodiment, the flange of the outer bracket body extends across the body in order to close the bore at one end. In this case, the support bracket would be used as a cap on the top of a leg supporting the top shelf of a table on the vertical leg.

The support bracket is constructed so that when in place, smooth uninterrupted surfaces are provided so that there is little risk of any food or other particles becoming lodged therein. At the same time, the bracket fits into the rectangular contour of a shelf so that there are no projecting surfaces extending from the contour of the table.

A table employing the support brackets may be readily assembled particularly since the brackets may be used to secure different thicknesses of shelving to different sizes of tubular legs. For example, the guide bolts of each bracket permit the inner body and outer body to be clamped to a wide range of thicknesses of shelving. Likewise, the bores provided in the outer body may accommodate different diameters of tubular legs. For example, where a smaller tubular leg than usual is inserted into a bore, a suitable shim or the like may be provided in the bore to secure the bracket to the leg.

Further, the bracket provides for simple dis-assembly of a table, for example for transport purposes.

These and other objects and advantages of the invention will become more apparent from the following detailed description taken in conjunction with the accompanying drawings wherein:

FIG. 1 illustrates a perspective view of a table constructed with support brackets in accordance with the invention;

FIG. 2 illustrates an exploded view of a corner of the table of FIG. 1;

FIG. 3 illustrates a top view of a support bracket constructed in accordance with the invention;

FIG. 4 illustrates a cross sectional view of a support bracket place on a tubular leg of circular cross-section of the table of FIG. 1;

FIG. 5 illustrates a cross sectional side view of a support bracket for an intermediate shelf of the table of FIG. 1 in accordance the invention;

FIG. 11 illustrates a plan view of an inner body of the bracket of FIG. 6;

FIG. 12 illustrates a front view of the body of FIG. 11;

FIG. 13 illustrates a bottom view of the body of FIG. 11;

FIG. 14 illustrates a view taken on line 14—14 of FIG. 12; and

FIG. 15 illustrates a side view of the body of FIG. 11.

Figure 6:
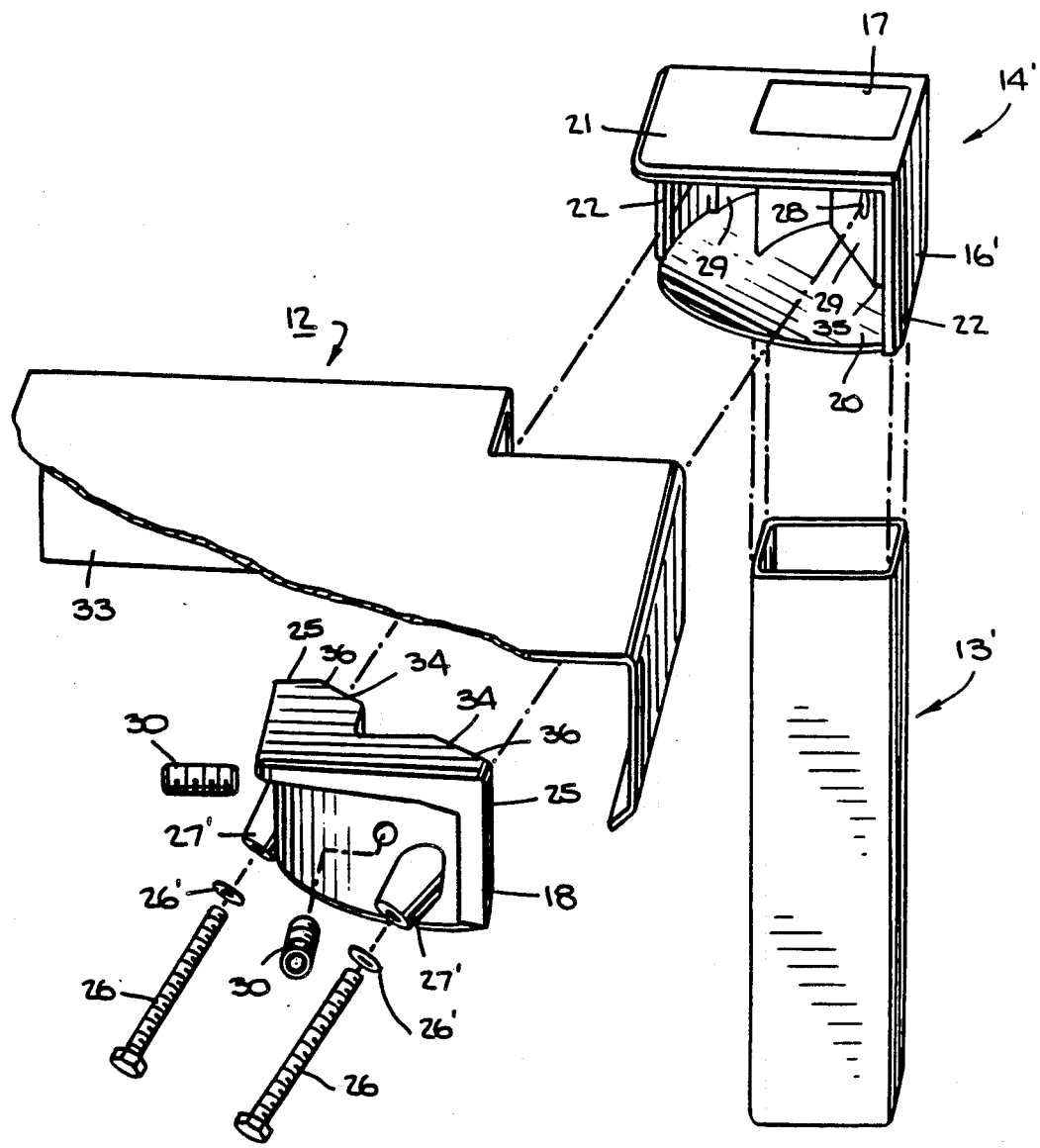
FIG. 6 illustrates an exploded view of a modified support bracket constructed in accordance with the invention for use with a tubular leg of square cross-section.

Referring to FIG. 1, the table 10 is constructed with a plurality of shelves, for example, a top shelf 11 and a bottom shelf 12, as well as a plurality of legs 13 of tubular shape, for example of circular cross-section as shown. In addition, the table 10 includes a plurality of support brackets 14, 15 which are disposed at the corners of the table 10.

The brackets 14 for securing the bottom shelf 12 to the legs 13 are each of the same construction. Hence, only one bracket 14 will be described.

Referring to FIGS. 3, 4 and 5, each bracket 14 includes an outer body 16 having a bore 17 for receiving a tubular leg 13 and a second body 18 having a recess 19 for receiving the tubular leg 13. In addition, the outer body 16 has a curvilinear conical cam surface 20 extending radially outwardly from the bore 17 and a flange 21 (see FIG. 5) which extends radially of the bore 17 in spaced relation to the cam surface 20. The outer body 16 also has a pair of angularly disposed walls 22 parallel to a central axis 23' of the bore 17. As indicated in FIG. 3, the walls 22 extend on opposite sides of the bore 17 and contain the cam surface 20 therebetween.

The inner body 18 has a curvilinear cam surface 23 along a lower face which is slidably mounted on the cam surface 20 of the outer body 16 in mating relation. In addition, the inner body 18 has a flange 24 which extends radially of the recess 19 in parallel relation to the flange 21 of the outer body. As indicated in FIG. 3, the inner body 18 is of generally arcuate shape so as to fit within the contour of the outer body 16 when in place, as indicated in FIG. 4.

The inner body 18 also has a pair of angularly disposed side walls 25, each of which is disposed in facing parallel relation to a side wall 22 of the outer body 16. As indicated in FIG. 3, the side walls 25 are disposed in planes which define a 90° angle.

Referring to FIGS. 4 and 5, a means in the form of a pair of bolts 26 is provided for adjusting the inner body 18 relative to the outer body 16. To this end, each bolt 26 passes through a bore 27 in the inner body 18 formed in part within a boss 27' on the body 18 into threaded engagement with a threaded bore 28 in a flat wall 29 of the outer body 16. As indicated in FIG. 5, the bolts 26 are disposed in parallel relation to each other in a plane disposed at an angle to the central axis 23 of the bore 17 in the outer body 16. For example, the plane of the bolts 26 is at an angle of 45° with respect to the central axis 23 of the bore 17. In addition, a washer 26' may be disposed on each bolt 26.

Referring to FIGS. 4 and 5, a means in the form of a locking screw 30 is threadably mounted a threaded bore 30' in the inner body 18 on an axis which intersects the central axis 23' of the bore 17 as well as an axis of the recess 19. As indicated, the threaded locking screw 30 abuts against a tubular leg 13 to secure the bracket 14 to the leg 13.

Referring to FIG. 2, the bottom shelf 12 is formed of sheet metal and has a flat horizontal top 31, a notch 32 in each corner and flat depending side walls 33 along each edge. As indicated, each pair of dependinq side walls 33 is disposed in angular relation to each other, for example at an angle of 90°.

In order to secure a leg 13 to the bottom shelf 12, a support bracket 14 is secured to each corner of the bottom shelf 12. To this end, the bolts 26 of a bracket are removed so that the two bodies 16, 18 can be separated from each other. The outer body 16 is then fitted over the notch 32 of the shelf 12 while the inner body 18 is fitted within the notch 32. The inner body 18 is slid along the cam surface 20 of the outer body 16 so that the spacing between the flanges 21, 24 is sufficient to readily accommodate the thickness of the bottom shelf 12. In this respect, the flanges 21, 24 sandwich the top 31 therebetween. Likewise, the depending side walls 33 of the shelf 12 are received within the gaps between the side walls 22, 25 of the bodies 16, 18 Next, the bolts 26 are passed through the inner body 18 and threaded into the outer body 16. During this time, the inner body 18 slides slightly along the cam surface 20 of the outer body 16 so that the top 31 and depending side walls 33 of the shelf 12 are clamped between the bodies 16, 18. In this respect, the angular disposition of the bolts 26 is such that the rate of decrease in the gap between the horizontal flanges 21, 24 decreases at the same rate as the gap between the vertical side walls 22, 25 of the bracket bodies 16, 18.

After a corner bracket 14 has been secured to each corner of the shelf 12, a leg 13 can be slid through the bore 17 of the outer body 16 and the locking screw 30 threaded into abutment against the leg 13.

Referring to FIG. 2, each top bracket 15 is of identical construction to an intermediate bracket 14 except that the flange 21 of the outer body 18' extends over the body 18' in order to close the bore 17 at one end. Thus, the outer body 18' serves a cap for a received leg 13.

Each top support bracket 15 is mounted on a top shelf 11 in the same fashion as a bottom bracket 14 is mounted on the bottom shelf 12.

After securement of the brackets 14, 15 to the shelves 12, 11, the legs 13 are slid into place and the respective locking screws 30 threaded into abutment with the respective legs 13.

Once a bracket has been secured to a corner of a sheet metal shelf, a firm clamping arrangement is provided. In this case, the bracket will not move relative to the flat top 31 since the depending sides 33 of the shelf 12 are securely held in place and prevent an outward movement of the bracket 14 relative to the shelf top 31.

Referring to FIG. 1, the assembled table 10 presents a retangular contour such that each leg 13 is mounted within the rectangular contour of the table 10 via the brackets 14, 15. In addition, as indicated in FIGS. 2 and 5, the brackets 14, 15 provides smooth uninterrupted surfaces which may be readily cleaned from time-to-time and in which food particles or the like cannot become lodges.

The bracket bodies 16, 18 may each be made of a metal casting or of plastic with the bolts 26 and locking screws 30 being made of suitable materials.

The depending side walls 33 of the shelving 11, 12 may have an inwardly angled lip to define a rounded external lower edge. In this case, the lips would terminate adjacent the corner brackets 14, 15 so as not to interfere with the clamping action of the bracket bodies 16, 18.

Referring to FIG. 6, wherein like reference characters indicate like parts as above, the corner brackets 14' may be constructed for receiving a tubular leg 13' of rectangular, i.e., square, cross-section In this case, the bodies 16', 18' are modified so as to receive the cross-section of the leg 13'.

Referring to FIGS. 7 to 10, the outer body 16' has a bore 17' of square shaved for receiving the square-shaped tubular leg 13' (see FIG. 6). In this respect the size of the bore 17' is sufficient to permit the leg to slide therethrough. In the event that the outer body 16' is to be used as a cap, the bore 17' would be closed over, as above.

Figure 10:
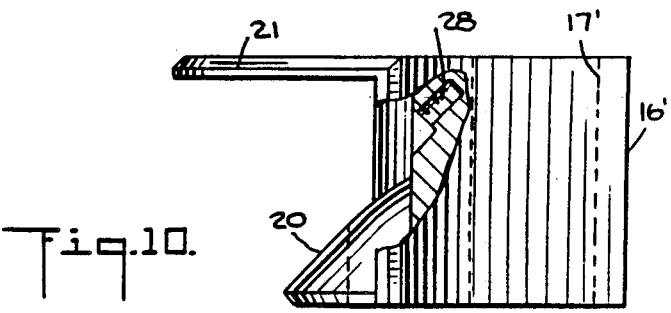
FIG. 10 illustrates a side view of the body of FIG. 7.

The outer body 16' has a curvilinear conical cam surface 20 extending outwardly from the bore 17' and a flange 21 which extends outwardly of the bore 17' in spaced relation to the cam surface 20. In addition, the outer body 16' has a pair of angularly disposed walls 22 and a pair of flat walls 29, each of which extends between an outer wall 22 and the bore 17'. A threaded bore 28 is also provided in each flat wall 29, as above. As illustrated in FIG. 10, each threaded bore 28 is disposed on an axis which is parallel to the plane of the conical cam surface 20, for example, the axis of the threaded bore 28 is on an angle of 45 degrees relative to a vertical plane and the conical cam surface 20 is at an angle of 45 degrees with respect to the vertical plane.

Referring to FIGS. 11 to 15, the inner body 18' has a recess 19 of triangular cross-section so as to receive the tubular leg (see FIG. 6) as well as a curvilinear cam surface 23 which is slidably mounted on the cam surface 20 of the outer body 16 in mating relation. In addition, the inner body 18 has a flange 24 extending outwardly of the recess 19, a pair of angularly disposed side walls 25 for fitting within and between the walls 22 of the outer body 16' and a pair of flat walls 34 each of which extends between the recess 19 and a respective end wall 25. As indicated in FIG. 6, the flat walls 34 are disposed in facing relation to the flat walls 29 of the outer body 16'.

Referring to FIGS. 12, 13 and 15, a pair of bosses 27' are provided on the inner body 16' on the opposite side from the recess 19. As indicated in FIG. 15, each boss 27' has a bore 27 which is disposed at an angle equal to the angle at which the threaded bores 28 in the outer body 16' are disposed, for example, at an angle of 45 degrees relative to a vertical plane.

Referring to FIG. 6, a means in the form of a pair of bolts 26 are provided for adjusting the inner body 18' relative to the outer body 16'. As indicated, each bolt 26 passes through a bore 27 in each boss 27' into threaded engagement with a threaded bore 28 in the outer body 16'. A suitable washer 26' is also disposed on each bolt 26.

Referring to FIG. 6, a means in the form of a pair of locking screws 30 are threadably mounted in respective threaded bores 30' (see FIG. 11) in the inner body 18' on axes which intersect the central axis of the bore 17' and the outer body 16'. In this respect, the axes of the threaded bores 30' intersect at a point in the plane of the flat walls 34 of the inner body 18'.

Figure 7:
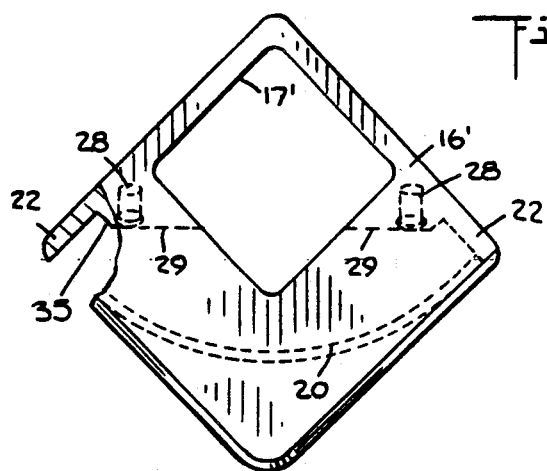
FIG. 7 illustrates a top view of an outer body of the clamp of FIG. 6.
Figure 9:
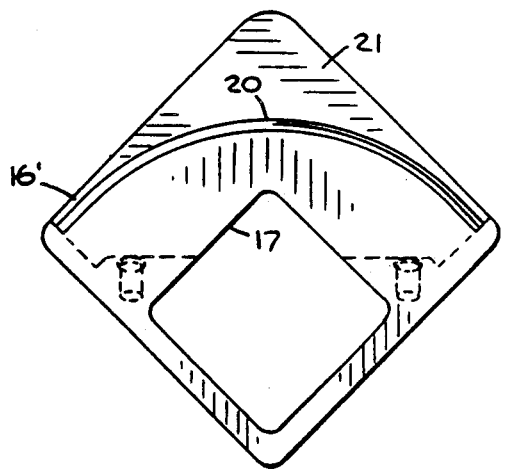
FIG. 9 illustrates a bottom view of the body of FIG. 7.
Figure 8:
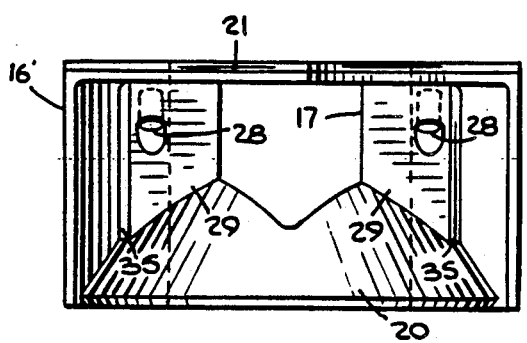
FIG. 8 illustrates a front view of the body of FIG. 7.

Referring to FIGS. 7 and 8, the outer body 16' is provided with a shoulder 35 between each end wall 22 and an adjacent flat wall 29 in facing relation to a shoulder 36 formed on the inner body 18' (see FIG. 11). As indicated in FIG. 7, each shoulder 35 is perpendicular to the end wall 22. Likewise, as shown in FIG. 11 each shoulder 36 of the inner body 18' is in a plane perpendicular to the end wall 25. The shoulders 35, 36 are sized so that the bodies 16', 18' fit one within the other in a mated relationship when brought together. This serves to increase the amount of surface area on the walls 22, 25 to maximize the clamping areas for holding a side wall 33 of a shelf 12.

Referring to FIG. 6, the operation of the corner bracket 14' is similar to the corner bracket 14 as described above. Hence, no further description is believed to be in order at this point. Of note, once the bracket bodies 16', 18' have been secured together via the bolts 26, so as secure a shelf 12 to the square-shaped leg 13', the threaded screws 30 are threaded into abutment with opposed sides of the leg 13'.

The support bracket permits the clamping of various thicknesses of panels to a tubular leg or tubular support. Generally the panels would be provided with clearance notches at each corner to be supported between the inner and outer bodies of the support bracket. In addition the cam surface 20 of the outer body would be disposed on a diameter 1.5 times the diameter of a leg of circular cross-section or 1.5 times the width of a flat leg of square cross-section. In any event, when in place, the support bracket does not leave openings greater than 0.032 inches, for example within which food particles and the like may accumulate. Also, when in place a support bracket is able to support a bent panel with equal force on three different sides surfaces.

The invention thus provides a support bracket that readily adjusts to various thicknesses of panels as well as providing a support bracket that can be adjusted to the height of horizontal panels on a tubular support.

The invention also provides a support bracket which can be readily utilized for securing a sheet metal shelf to a leg.

Further the invention provides a support bracket which can be made of relatively simple pieces and which can be readily mounted in place.

What is claimed is:

1. A corner support bracket assembly comprising
a first body having a bore for receiving a tubular leg, a first curvilinear cam surface extending radially outwardly from said bore, and a first flange extending radially of said bore in spaced relation to said cam surface;
a second body having a recess for receiving a tubular leg disposed in said bore, a second curvilinear cam surface slidably mounted on said first cam surface in mating relation, and a second flange extending radially of said recess and in parallel relation to said first flange for clamping a flat object therebetween;
first means for adjusting said second body relative to said first body; and
second means in said second body for engaging a tubular leg in said recess in locking relation.

2. A corner support bracket assembly as set forth in claim 1 wherein said flange of said first body extends over said first body to close said bore at one end thereof.

3. A corner support bracket assembly as set forth in claim 1 wherein said first body has a pair of angularly disposed walls parallel to a central axis of said bore and extending on opposite sides of said bore and said second body has a pair of angularly disposed side walls, each said side wall of said second body being disposed in facing parallel relation to a respective side wall of said first body.

4. A corner support bracket assembly as set forth in claim 1 wherein said first means includes a pair of bolts extending through said second body in parallel relation and threaded into said first body, said bolts being disposed in a plane at an angle to a central axis of said bore.

5. A corner support bracket assembly as set forth in claim 4 wherein said angle is a 45° angle.

6. A corner support bracket assembly as set forth in claim 4 wherein said second means is a locking screw threadably mounted in said second body between said bolts.

7. A corner support bracket assembly as set forth in claim 1 wherein said second means includes at least one locking screw threadably mounted in said second body.

8. A corner support bracket assembly as set forth in claim 1 wherein said first curvilinear cam surface has a conical cross-section.

9. A corner support bracket assembly as set forth in claim 1 wherein said bore is of circular shape.

10. A corner support bracket assembly as set forth in claim 1 wherein said bore is of rectangular shape and said recess is of triangular shape.

11. A corner support bracket assembly as set forth in claim 10 wherein said first body has a first pair of shoulders thereon and said second body has a second pair of shoulders thereon in facing relation with said first pair of shoulders.

12. A corner support bracket assembly comprising
a first body having a bore extending therethrough on a central axis to receive a tubular leg, a cam surface extending radially outwardly from said bore, and a first flange extending radially of said bore in spaced relation to said cam surface;
a second body having a recess for receiving a tubular leg disposed in said bore, a second cam surface slidably mounted on said first cam surface in mating relation, and a second flange extending radially of said recess and in parallel relation to said first flange for clamping a flat object therebetween;
first means for adjusting said second body relative to said first body along a plane disposed at an angle to said axis; and
second means in said second body for engaging a tubular leg in said recess in locking relation.

13. A corner support bracket assembly as set forth in claim 12 wherein said first body has a pair of angularly disposed walls parallel to a central axis of said bore and extending on opposite sides of said bore and said second body has a pair of angularly disposed side walls, each said side wall of said second body being disposed in facing parallel relation to a respective side wall of said first body.

14. A corner support bracket assembly as set forth in claim 13 wherein said first means includes a pair of bolts extending through said second body in parallel relation and threaded into said first body.

15. A corner support bracket assembly as set forth in claim 12 wherein said first means includes a pair of bolts extending through said second body in parallel relation and threaded into said first body.

16. A corner support bracket assembly as set forth in claim 15 wherein said angle is a 45° angle.

17. A corner support bracket assembly as set forth in claim 12 wherein said second means includes at least one locking screw threadably mounted in said second body.

18. The combination comprising
a shelf having a flat horizontal top and a notch in a corner thereof;
at least one tubular leg disposed within said notch of said shelf for supporting said shelf; and
a corner support bracket assembly clamping said shelf to said leg, said assembly including a first body having a bore receiving said leg, a cam surface extending radially outwardly from said bore and first flange extending over said flat top of said shelf; a second body having a recess receiving said leg, a second cam surface slidably mounted on said first cam surface in mating relation and a second flange extending under said flat top of said shelf; and means for adjusting said second body relative to said first body along a plane disposed at an angle to said leg to clamp said flat top between said flanges.

19. The combination as set forth in claim 18 wherein said shelf has at least a pair of depending side walls disposed in angular relation to each other, said first body has a pair of side walls overlapping said side walls of said shelf and said second body has a pair of angularly disposed side walls in facing relation to said side walls of said first body to clamp said side walls of said shelf therebetween.

20. The combination as set forth in claim 19 wherein said first means includes a pair of bolts extending through said second body in parallel relation and threaded into said first body.

21. The combination as set forth in claim 20 which further comprises means in said second body for engaging said leg in locking relation.

22. The combination as set forth in claim 18 wherein each cam surface is curvilinear.

23. The combination as set forth in claim 22 wherein said angle is a 45° angle.

24. The combination as set forth in claim 18 wherein said tubular leg is of circular cross-section, said bore is of circular cross-section and said recess is of arcuate shape.

25. The combination as set forth in claim 18 wherein said tubular leg is of square-cross-section, said bore is of square shape and said recess is of triangular shape.

26. The combination as set forth in claim 18 wherein said first body has the first pair of shoulders and said second body has a second pair of shoulders in facing relation to said first pair of shoulders.

* * * * *

UNITED STATES PATENT AND TRADEMARK OFFICE
CERTIFICATE OF CORRECTION

PATENT NO. : 5,002,247

DATED : March 26, 1991

INVENTOR(S) : JOHN A. DISPENZA

It is certified that error appears in the above-identified patent and that said Letters Patent is hereby corrected as shown below:

```
Column 1, lines 22 and 23 change "of case" to -case of-
Column 4, lines 38 change "dependinq" to -depending-
Column 5, line 39 change "cross-section" to -cross-section.-
Column 5, line 43 change "shaved" to -shape-
```

Signed and Sealed this

Sixth Day of October, 1992

Attest:

DOUGLAS B. COMER

Attesting Officer

Acting Commissioner of Patents and Trademarks